(12) United States Patent
Zhang et al.

(10) Patent No.: US 9,884,980 B2
(45) Date of Patent: Feb. 6, 2018

(54) PVC SELF-ADHESIVE FLOORBOARD WITH WATER-RESISTANT GLUE

(71) Applicant: Xiaoling Zhang, Wujin Changzhou, Jiangsu (CN)

(72) Inventors: Xiaoling Zhang, Jiangsu (CN); Zhiyuan Xiao, Jiangsu (CN)

(73) Assignee: Xiaoling Zhang, Wujin Changzhou (CN)

( * ) Notice: Subject to any disclaimer, the term of this patent is extended or adjusted under 35 U.S.C. 154(b) by 0 days.

(21) Appl. No.: 15/104,984

(22) PCT Filed: Apr. 4, 2014

(86) PCT No.: PCT/CN2014/074799
§ 371 (c)(1),
(2) Date: Jun. 16, 2016

(87) PCT Pub. No.: WO2015/089957
PCT Pub. Date: Jun. 25, 2015

(65) Prior Publication Data
US 2016/0319170 A1    Nov. 3, 2016

(30) Foreign Application Priority Data
Dec. 19, 2013   (CN) .......................... 2013 1 0699234

(51) Int. Cl.
| | |
|---|---|
| B32B 7/12 | (2006.01) |
| C09J 157/02 | (2006.01) |
| E04F 15/02 | (2006.01) |
| E04F 15/10 | (2006.01) |
| B32B 25/08 | (2006.01) |
| B32B 27/30 | (2006.01) |
| B32B 7/06 | (2006.01) |
| B32B 27/08 | (2006.01) |
| C09J 153/02 | (2006.01) |

(52) U.S. Cl.
CPC ............... *C09J 157/02* (2013.01); *B32B 7/06* (2013.01); *B32B 7/12* (2013.01); *B32B 25/08* (2013.01); *B32B 27/08* (2013.01); *B32B 27/302* (2013.01); *B32B 27/304* (2013.01); *C09J 153/02* (2013.01); *E04F 15/0215* (2013.01); *E04F 15/02155* (2013.01); *E04F 15/105* (2013.01); *E04F 15/107* (2013.01); *B32B 2307/554* (2013.01); *B32B 2307/584* (2013.01); *B32B 2307/7265* (2013.01); *B32B 2471/00* (2013.01)

(58) Field of Classification Search
None
See application file for complete search history.

(56) References Cited

U.S. PATENT DOCUMENTS

| | | | |
|---|---|---|---|
| 6,288,149 B1 * | 9/2001 | Kroll ....................... | A61L 15/58 524/292 |
| 2007/0071988 A1 | 3/2007 | Botros | |
| 2011/0217528 A1 * | 9/2011 | Wiercinski ................ | C09J 7/02 428/213 |
| 2013/0183522 A1 * | 7/2013 | Takada ................. | A61F 13/0253 428/354 |
| 2016/0230399 A1 * | 8/2016 | Zhang ............... | E04F 15/02172 |

FOREIGN PATENT DOCUMENTS

| | | |
|---|---|---|
| CN | 101864259 A | 10/2010 |
| CN | 103097130 A | 5/2013 |

OTHER PUBLICATIONS

"Hydrogenated C5, Aliphatic Resins", EASTMAN, Jun. 20, 2017.*
"The cycloalkyl oil-kind of ideal rubber plasticizer", Plastic Machinery Network, published on Apr. 27, 2013.*

* cited by examiner

Primary Examiner — Anish Desai
(74) Attorney, Agent, or Firm — JMB Davis Ben-David

(57) ABSTRACT

A self-adhesive floorboard with water-resistant glue comprises from a top to a bottom sequentially a main body layer, an isolation layer and the water-resistant glue, wherein each component proportion of component composition of the water-resistant glue based on a weight percentage is: 34-38% for a styrene-isoprene-styrene block copolymer, 46.4-50.4% for C5 hydrogenated petroleum resin, 13-17% for cycloalkyl rubber extender oil and 0.5-0.6% for a hindered phenol antioxidant. The isolation layer between the main body layer and the water-resistant glue is a PVC film of OPHR. The water-resistant glue of the PVC self-adhesive floorboard with the water-resistant glue is provided with a water-resistance function, and can prevent a plasticizer from drifting away from the PVC floorboard to affect stickiness of the water-resistant glue.

4 Claims, 1 Drawing Sheet

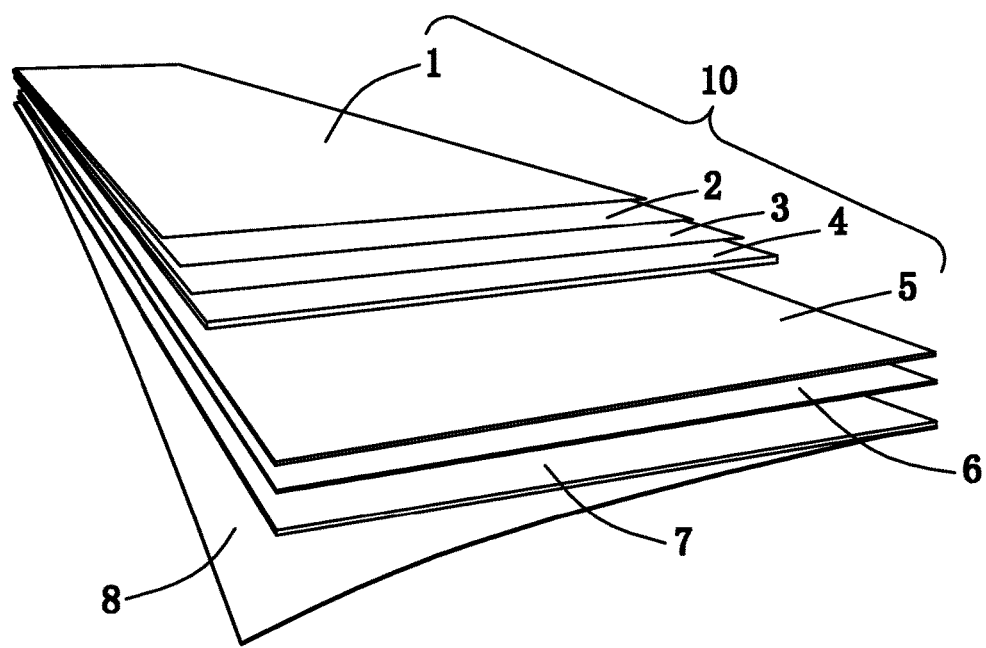

PVC SELF-ADHESIVE FLOORBOARD WITH WATER-RESISTANT GLUE

CROSS-REFERENCE TO RELATED APPLICATIONS

This is the U.S. National Stage of International Patent Application No. PCT/CN2014/074799, filed Apr. 4, 2014, which in turn claims the benefit of China Patent Application No. 201310699234.5, filed Dec. 19, 2013.

BACKGROUND OF THE INVENTION

1. Field of the Invention

The present invention relates to a PVC floorboard, and more particularly to a PVC self-adhesive floorboard with water-resistant glue.

2. Description of the Prior Art

Glue of prior PVC self-adhesive floorboard is directly applied to back of PVC floorboard without isolation layers between glue and floorboard. Because a large number of plasticizer is contained in the PVC floorboard, it is easy to be drifted away while using. It not only gelatinizes and loses stickiness, but also leaves the glue stuck onto the ground and thus unable to be removed. This causes great difficulty in handling the ground when replacing the floorboard afterwards.

Besides, there is no water-resistant function in the glue of prior PVC self-adhesive floorboard. When the glue is wet, it loses stickiness.

BRIEF SUMMARY OF THE INVENTION

In order to overcome the defects of the prior art, the present invention provides a PVC self-adhesive floorboard with water-resistant glue. The glue thereof is water-resistant, can prevent a plasticizer from drifting away from the PVC floorboard to affect stickiness of the water-resistant glue.

In order to achieve the above object of the present invention, the present invention adopts the following technical solution.

A PVC self-adhesive floorboard with water-resistant glue, comprises a main body layer, an isolation layer and water-resistant glue from a top to a bottom, compositions of water-resistant glue comprise: styrene-isoprene-styrene block copolymer from 34 to 38 weight percent, C5 hydrogenated petroleum resin from 46.4 to 50.4 weight percent, cycloalkyl rubber extender oil from 13 to 17 weight percent, hindered phenol antioxidant from 0.5 to 0.6 weight percent.

Further, the compositions of the water-resistant glue comprise 36 weight percent styrene-isoprene-styrene block copolymer, 48.4 weight percent C5 hydrogenated petroleum resin, 15 weight percent cycloalkyl rubber extender oil and 0.6 weight percent hindered phenol antioxidant.

Further, the isolation layer between the main body layer and the water-resistant glue is PVC film of 0 PHR.

Further, the PVC self-adhesive floorboard with water-resistant glue further comprises a layer of release paper located under the water-resistant glue, to protect the water-resistant glue.

Further, the main body layer comprises a PU coating, a wear-resistance layer, a printing layer, a PVC medium material layer and a PVC bottom material layer.

The present invention has the following beneficial effects.

The plasticizer is blocked and not be drifted away to the water-resistant glue to react with it by adding an isolation layer between the main body layer and the water-resistant glue of the present invention. It keeps the stickiness of the water-resistant glue and does not leave glue imprint difficult to erase when replacing floorboard.

Secondly, the present invention abandons traditional hot-melt adhesive and uses water-resistant glue with better water-resistant function. Even it is put into water, stickiness can be restored as long as it is air-dried.

BRIEF DESCRIPTION OF THE DRAWINGS

FIG. 1 is a structural schematic view of a PVC self-adhesive floorboard with water-resistant glue of the present invention.

REFERENCE NUMERALS

1 PU coating
2 wear-resistance layer
3 printing layer
4 PVC medium material layer
5 PVC bottom material layer
6 isolation layer
7 water-resistant glue
8 release paper
10 main body layer

DETAILED DESCRIPTION OF THE PREFERRED EMBODIMENTS

The following text will further describe the present invention with reference to the accompanying drawings.

Please refer to FIG. 1, a PVC self-adhesive floorboard with water-resistant glue comprises a main body layer 10, an isolation layer 6, water-resistant glue 7 and release paper 8 from a top to a bottom. Wherein, the main body layer 10 comprises a PU coating 1, a wear-resistance layer 2, a printing layer 3, a PVC medium material layer 4 and a PVC bottom material layer 5. In the PVC self-adhesive floorboard with water-resistant glue, the PU coating 1, the wear-resistance layer 2, the printing layer 3, the PVC medium material layer 4 and the PVC bottom material layer 5 all adopt compositions of the existing PVC self-adhesive floorboard. A large number of plasticizers are contained between the PVC medium material layer 4 and the PVC bottom material layer 5. The isolation layer 6 is newly added between the main body layer 10 and the water-resistant glue 7. In the embodiment of the present invention, the isolation layer 6 is PVC film of 0 PHR. The compositions of the water-resistant glue 7 comprise styrene-isoprene-styrene block copolymer from 34 to 38 weight percent, C5 hydrogenated petroleum resin from 46.4 to 50.4 weight percent, cycloalkyl rubber extender oil from 13 to 17 weight percent, hindered phenol antioxidant from 0.5 to 0.6 weight percent.

Preferably, the compositions of the water-resistant glue 7 comprise 36 weight percent styrene-isoprene-styrene block copolymer, 48.4 weight percent C5 hydrogenated petroleum resin, 15 weight percent cycloalkyl rubber extender oil and 0.6 weight percent hindered phenol antioxidant. The layer of the release paper 8 located under the water-resistant glue 7 can protect the water-resistant glue 7.

The plasticizer is blocked and not be drifted away to the water-resistant glue to react with it by adding the isolation layer between the main body layer and the water-resistant glue of the present invention. It keeps the stickiness of the water-resistant glue and does not leave glue imprint difficult to erase when replacing floorboard.

Secondly, the present invention abandons traditional hot-melt adhesive and uses water-resistant glue with better water-resistant function. Even it is put into water, the stickiness can be restored as long as it is air-dried.

The technical scope of the present invention is not limited to the above description of the contents. Any person who skilled in the art may deform and modify the embodiment of the present invention within the spirit and scope of the appended claims, but these deformation and modification belong to the protection scope of the present invention.

What is claimed is:

1. A PVC self-adhesive floorboard with water-resistant glue, comprising a main body layer, an isolation layer and water-resistant glue from a top to a bottom; wherein the water-resistant glue comprises: styrene-isoprene-styrene block copolymer from 34 to 38 weight percent, C5 hydrogenated petroleum resin from 46.4 to 50.4 weight percent, cycloalkyl rubber extender oil from 13 to 17 weight percent, and hindered phenol antioxidant from 0.5 to 0.6 weight percent; wherein the main body layer comprises a PU coating, a wear-resistance layer, a printing layer, a first PVC layer and a second PVC layer.

2. The PVC self-adhesive floorboard with water-resistant glue as claimed in claim 1, wherein the water-resistant glue comprises 36 weight percent Styrene-isoprene-styrene block copolymer, 48.4 weight percent C5 hydrogenated petroleum resin, 15 weight percent cycloalkyl rubber extender oil and 0.6 weight percent hindered phenol antioxidant.

3. The PVC self-adhesive floorboard with water-resistant glue as claimed in claim 1, wherein the isolation layer between the main body layer and the water-resistant glue is PVC film.

4. The PVC self-adhesive floorboard with water-resistant glue as claimed in claim 1, further comprises a layer of release paper located under the water-resistant glue to protect the water-resistant glue.

* * * * *